(12) United States Patent
Saluja et al.

(10) Patent No.: US 11,751,087 B2
(45) Date of Patent: *Sep. 5, 2023

(54) PREDICTING WHETHER A USER OF A WIRELESS TELECOMMUNICATION NETWORK WILL REPORT A PROBLEM

(71) Applicant: T-Mobile USA, Inc., Bellevue, WA (US)

(72) Inventors: Aditi Saluja, Bellevue, WA (US); Ting Zhang, Bellevue, WA (US); Vikas Ranjan, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/723,180

(22) Filed: Apr. 18, 2022

(65) Prior Publication Data

US 2022/0248250 A1    Aug. 4, 2022

Related U.S. Application Data

(63) Continuation of application No. 16/932,618, filed on Jul. 17, 2020, now Pat. No. 11,337,096.

(51) Int. Cl.
| | | |
|---|---|---|
| *H04W 24/10* | (2009.01) | |
| *H04L 41/5009* | (2022.01) | |
| *G06N 20/00* | (2019.01) | |
| *H04B 17/318* | (2015.01) | |
| *H04W 4/24* | (2018.01) | |

(52) U.S. Cl.
CPC ............ *H04W 24/10* (2013.01); *G06N 20/00* (2019.01); *H04B 17/318* (2015.01); *H04L 41/5009* (2013.01); *H04W 4/24* (2013.01)

(58) Field of Classification Search
CPC ...... H04W 24/10; H04W 4/24; H04B 17/318; G06N 20/00; H04L 41/5009
See application file for complete search history.

(56) References Cited

U.S. PATENT DOCUMENTS

| | | |
|---|---|---|
| 8,301,149 B2 | 10/2012 | Del Rio Romero et al. |
| 8,332,256 B2 | 12/2012 | Dey et al. |

(Continued)

FOREIGN PATENT DOCUMENTS

| | | | | |
|---|---|---|---|---|
| CN | 103596650 A | * | 2/2014 | ........... G01S 5/0252 |

*Primary Examiner* — Samina F Choudhry
(74) *Attorney, Agent, or Firm* — Perkins Coie LLP (57) ABSTRACT

Presented here is a method to predict whether a user of a wireless telecommunication network will report a problem or issue associated with the wireless telecommunication network. A processor can obtain multiple key performance indicators (KPIs) describing a user experience with the wireless telecommunication network. The processor can calculate at least a daily value of each KPI according to a rule specific to the KPI. The processor can create an image representing a value of each KPI, where a first axis of the image identifies the KPI, and where a second axis of the image represents the daily value of the KPI. The processor can predict whether the user of the wireless telecommunication network will report the problem by providing the image to a machine learning model and receiving a prediction from the machine learning model whether the user of the wireless telecommunication network will report the problem.

19 Claims, 7 Drawing Sheets

(56) References Cited

U.S. PATENT DOCUMENTS

| | | |
|---|---|---|
| 8,966,055 B2 | 2/2015 | Mittal et al. |
| 9,119,086 B1 | 8/2015 | Ouyang et al. |
| 9,379,949 B2 | 6/2016 | Appachiappan et al. |
| 9,392,473 B2 | 7/2016 | Kapnadak et al. |
| 9,590,877 B2 | 3/2017 | Choudhary et al. |
| 9,622,123 B2 | 4/2017 | Dimou et al. |
| 9,622,137 B2 | 4/2017 | Yang et al. |
| 9,655,020 B2 | 5/2017 | Wegmann et al. |
| 9,716,633 B2 | 7/2017 | Premkumar et al. |
| 10,581,664 B1 | 3/2020 | Peng et al. |
| 2010/0123575 A1 | 5/2010 | Mittal et al. |
| 2011/0173051 A1 | 7/2011 | Dey et al. |
| 2012/0072267 A1* | 3/2012 | Gutierrez, Jr. ... G06Q 10/06393 705/7.11 |
| 2013/0304905 A1 | 11/2013 | Appachiappan et al. |
| 2013/0331103 A1 | 12/2013 | Yang et al. |
| 2014/0200004 A1 | 7/2014 | Wegmann et al. |
| 2015/0289149 A1 | 10/2015 | Ouyang et al. |
| 2016/0007217 A1 | 1/2016 | Kapnadak et al. |
| 2016/0104091 A1 | 4/2016 | Fletcher et al. |
| 2016/0157114 A1 | 6/2016 | Kalderen et al. |
| 2016/0234686 A1* | 8/2016 | Bone ............... H04L 63/029 |
| 2016/0261468 A1 | 9/2016 | Premkumar et al. |
| 2016/0360539 A1 | 12/2016 | Ben Ami et al. |
| 2016/0381580 A1 | 12/2016 | Kwan |
| 2017/0052957 A1 | 2/2017 | Belletti et al. |
| 2017/0078171 A1 | 3/2017 | Tapia et al. |
| 2017/0353991 A1* | 12/2017 | Tapia ............... H04L 41/0631 |
| 2018/0270126 A1 | 9/2018 | Tapia |
| 2019/0068443 A1 | 2/2019 | Li et al. |
| 2019/0132757 A1 | 5/2019 | Tapia et al. |
| 2019/0171438 A1* | 6/2019 | Franchitti ............ G06N 20/00 |
| 2019/0236556 A1* | 8/2019 | Morisawa ........... G06Q 10/067 |
| 2019/0386759 A1* | 12/2019 | Singh ................ H04B 17/27 |
| 2020/0099572 A1 | 3/2020 | Peng et al. |
| 2020/0104433 A1 | 4/2020 | Santarone et al. |
| 2020/0336923 A1* | 10/2020 | Li ..................... H04W 24/02 |
| 2021/0165708 A1* | 6/2021 | Vijayaraghavan .......................... G06F 11/0754 |

\* cited by examiner

PREDICTING WHETHER A USER OF A WIRELESS TELECOMMUNICATION NETWORK WILL REPORT A PROBLEM

CROSS-REFERENCE TO RELATED APPLICATION

This application is a continuation of U.S. patent application Ser. No. 16/932,618, filed on Jul. 17, 2020, entitled PREDICTING WHETHER A USER OF A WIRELESS TELECOMMUNICATION NETWORK WILL REPORT A PROBLEM, which is hereby incorporated by reference in its entirety.

BACKGROUND

There are multiple wireless telecommunication networks, and users of the wireless telecommunication networks, such as cell phone users, can easily switch between various wireless telecommunication network providers if they experience problems with one of the networks. The problems can include dropped calls, lack of reception, low throughput rates, etc. When experiencing a problem, most users do not report the problem but simply switch wireless telecommunication networks and providers. A small fraction of the users experiencing problems report the problem by, for example, calling a customer care center. An average duration of a call is approximately ten minutes, and given millions of users of the network, the cost of care calls can be significant.

DETAILED DESCRIPTION

Presented here is a method to predict whether a user of a wireless telecommunication network will report a problem associated with the wireless telecommunication network. A processor or network server can obtain multiple key performance indicators (KPIs) describing a user experience with the wireless telecommunication network. The multiple KPIs can include billing account number (BAN) count, tenure, Reference Signals Received Power (RSRP), and Reference Signal Received Quality (RSRQ), an hourly throughput count, a software change count, a device change count, a customer complaint count, a ratio of dropped calls to placed calls, and a number of repeated calls, etc. The processor calculates a daily value of each KPI by processing a KPI among the multiple KPIs according to a rule specific to the KPI. The processor creates an image representing a color-coded value of each KPI, where a first axis of the image represents the KPI, and where a second axis of the image represents the daily value of the KPI. The processor can predict whether the user of the wireless telecommunication network will report the problem associated with the wireless telecommunication network by providing the image to a machine learning model (e.g., a convolutional neural network) and receiving a prediction from the machine learning model whether the user of the wireless telecommunication network will report the problem.

The processor can obtain multiple reports and/or predictions of multiple problems associated with the wireless telecommunication network, and multiple geolocations of the multiple reports. The processor can identify an area among the multiple geolocations having a number of reports exceeding a predetermined threshold and flag the area as requiring further action, such as installing an additional cell tower. By identifying problematic areas of the wireless telecommunication network, and remedying the problems, the number of dissatisfied users is decreased, and the number of calls to report the problems is reduced.

In addition, the predictions can be used in customer care, network planning and/or marketing, etc. In customer care, a representative of the wireless telecommunication network can use the prediction as a background on what the user has likely experienced. The representative can be an autonomous agent, such as a chatbot. Based on the background and the interaction with the user, the representative can identify if network issues are at user's home or work. If a high-value user has sustained poor network experience, the representative can send out a proactive SMS with service credits, bonus data, or other relevant incentives.

In network planning, if there is network complaint in an area and the complaint has been there for some time, such as more than a month, then the complaint is an indicator that a sector should be added, a cell should be split, or a small cell should be deployed. The selection of the appropriate response can vary based on place and conditions. If there is a plan to perform a network upgrade in an area where users have experienced network issues, the processor can send out an SMS to inform affected users.

In marketing, if network issues are associated with specific devices, the processor can send a proactive SMS offering a device upgrade. A processor can plan marketing campaigns around best performing devices. If a user device has sustained network issues in an area where no upgrades are planned, the processor can provide to the user device a link to other wireless telecommunication network providers.

Figure 1:
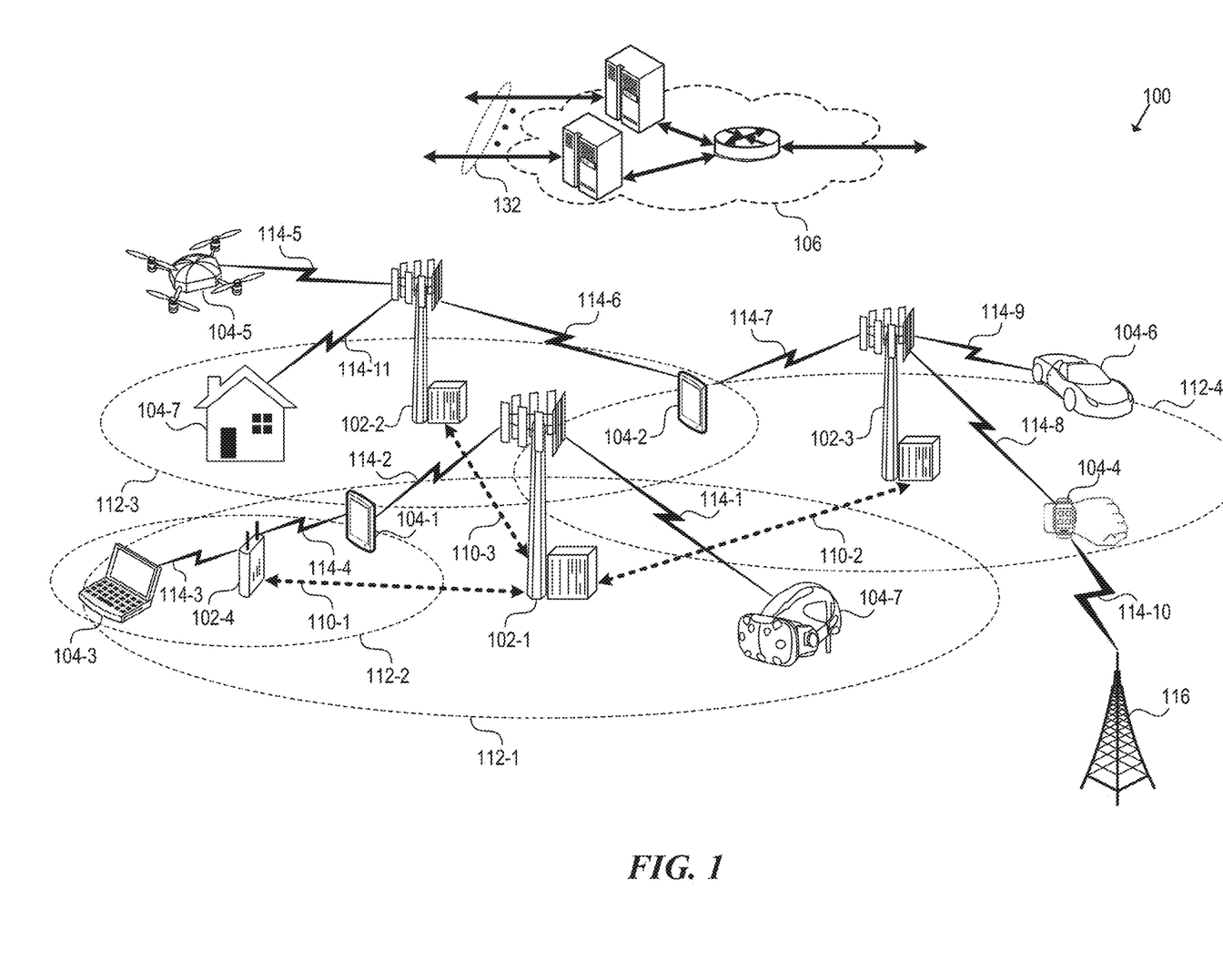
FIG. 1 is a block diagram that illustrates a wireless telecommunication network in which aspects of the disclosed technology are incorporated.

FIG. 1 is a block diagram that illustrates a wireless telecommunication network 100 ("system 100") in which aspects of the disclosed technology are incorporated. The system 100 includes base stations 102-1 through 102-4 (also referred to individually as "base station 102" or collectively as "base stations 102"). A base station is a type of network access node (NAN) that can also be referred as a cell site, a base transceiver station, or a radio base station. The system 100 can include any combination of NANs including an access point, a radio transceiver, a gNodeB (gNB), NodeB, eNodeB (eNB), Home NodeB, a Home eNodeB, or the like. In addition to being a WWAN base station, a NAN can be a WLAN access point, such as an IEEE 802.11 access point.

The NANs of a network formed by the system 100 also includes wireless devices 104-1 through 104-8 (referred to individually as "wireless device 104" or collectively as "wireless devices 104") and a core network 106. The wireless devices 104-1 through 104-8 are capable of communication using various connectivity standards. For example, a 5G communication channel can use millimeter waver (mmW) access frequencies of 28 GHz or more. In some implementations, the wireless device 104 can operatively couple to a base station 102 over an LTE/LTE-A communication channel, which is referred to as a 4G communication channel.

The core network 106 can provide, manage, or control security services, user authentication, access authorization, tracking, Internet Protocol (IP) connectivity, and other access, routing, or mobility functions. The base stations 102 interface with the core network 106 through a first set of backhaul links 108 (e.g., S1 interfaces) and can perform radio configuration and scheduling for communication with the wireless devices 104 or can operate under the control of a base station controller (not shown). In some examples, the base stations 102 can communicate, either directly or indirectly (e.g., through the core network 106), with each other over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The system 100 can include base stations of different types (e.g., macro and/or small cell base stations). In some implementations, there can be overlapping geographic coverage areas 112 for different service environments (e.g., Internet-of-Things (IOT), mobile broadband (MBB), vehicle-to-everything (V2X), machine-to-machine (M2M), machine-to-everything (M2X), ultra-reliable low-latency communication (URLLC), machine-type communication (MTC)).

In some examples, the system 100 can include a 5G network and/or an LTE/LTE-A network. In an LTE/LTE-A network, the term eNB is used to describe the base stations 102 and, in 5G or new radio (NR) networks, the term gNBs is used to describe the base stations 102 that include mmW communications. The system 100 can form a heterogeneous network in which different types of base stations provide coverage for various geographical regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow unrestricted access by wireless devices with service subscriptions with the network provider. As indicated earlier, a small cell is a lower-powered base station, as compared with a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices with service subscriptions with the network provider. A femto cell covers a relatively small geographic area (e.g., a home) and can provide restricted access by wireless devices having an association with the femto cell (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network are NANs, including small cells. The table below shows relative characteristics of small cells.

| Types of Small Cell | Coverage Radius | Indoor or Outdoor | Transmit Power | Number of Users | Backhaul Type | Cost |
|---|---|---|---|---|---|---|
| Femto cells | 30-165 ft 10-50 m | Indoor | 100 mW | 8-16 | Wired, fiber | Low |
| Pico cells | 330-820 ft 100-250 m | Indoor Outdoor | 20 dBm 24 dBm | 32-64 | Wired, fiber | Low |
| Micro cells | 1600-8000 ft 500-2500 | Outdoor | 2000-5000 mW 33-37 dBm | 200 | Wired, Fiber, Microwave | Medium |

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

As illustrated, the wireless devices 104 are distributed throughout the system 100, where each wireless device 104 can be stationary or mobile. A wireless device can be referred to as a mobile station, a subscriber station, a mobile unit, a subscriber unit, a wireless unit, a remote unit, a handheld mobile device, a remote device, a mobile subscriber station, an access terminal, a mobile terminal, a wireless terminal, a remote terminal, a handset, a mobile client, a client, or the like. Examples of a wireless device include user equipment (UE) such as a mobile phone, a personal digital assistant (PDA), a wireless modem, a handheld mobile device (e.g., wireless devices 104-1 and 104-2), a tablet computer, a laptop computer (e.g., wireless device 104-3), a wearable (e.g., wireless device 104-4). A wireless device can be included in another device such as, for example, a drone (e.g., wireless device 104-5), a vehicle (e.g., wireless device 104-6), an augmented reality/virtual reality (AR/VR) device such as a head-mounted display device (e.g., wireless device 104-7), an IoT device such as an appliance in a home (e.g., wireless device 104-8), or a wirelessly connected sensor that provides data to a remote server over a network.

A wireless device can communicate with various types of base stations and network equipment at the edge of a network including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-11 (also referred to individually as "communication link 114" or collectively as "communication links 114") shown in system 100 include uplink (UL) transmissions from a wireless device 104 to a base station 102, and/or downlink (DL) transmissions, from a base station 102 to a wireless device 104. The downlink transmissions may also be called forward link transmissions while the uplink transmissions may also be called reverse link transmissions. Each communication link 114 includes one or more carriers, where each carrier can be a signal composed of multiple sub-carriers (e.g., waveform signals of different frequencies) modulated according to the various radio technologies described above. Each modulated signal can be sent on a different sub-carrier and carry control information (e.g., reference signals, control channels), overhead information, user data, etc. The communication links 114 can transmit bidirectional communications using FDD (e.g., using paired spectrum resources) or TDD operation (e.g., using unpaired spectrum resources). In some embodiments, the communication links 114 include LTE and/or mmW communication links.

In some embodiments of the system 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that may take advantage of multi-path environments to transmit multiple spatial layers carrying the same or different coded data.

In some embodiments, the wireless devices 104 are capable of communicating signals via the LTE network and an mmW system (e.g., as part of a 5G/NR system). Accordingly, the wireless device 104 can communicate with the base station 102 over an LTE link and/or with a transmission point (TP) or base station (BS) over an mmW link. In another example, at least one of the base stations 102 communicates signals via the LTE network and the mmW system over one or more communication links 114. As such, a base station 116 may be referred to as an LTE+mmW eNB or gNB or as an LTE+mmW TP/BS/mmW-BS.

Figure 2A:
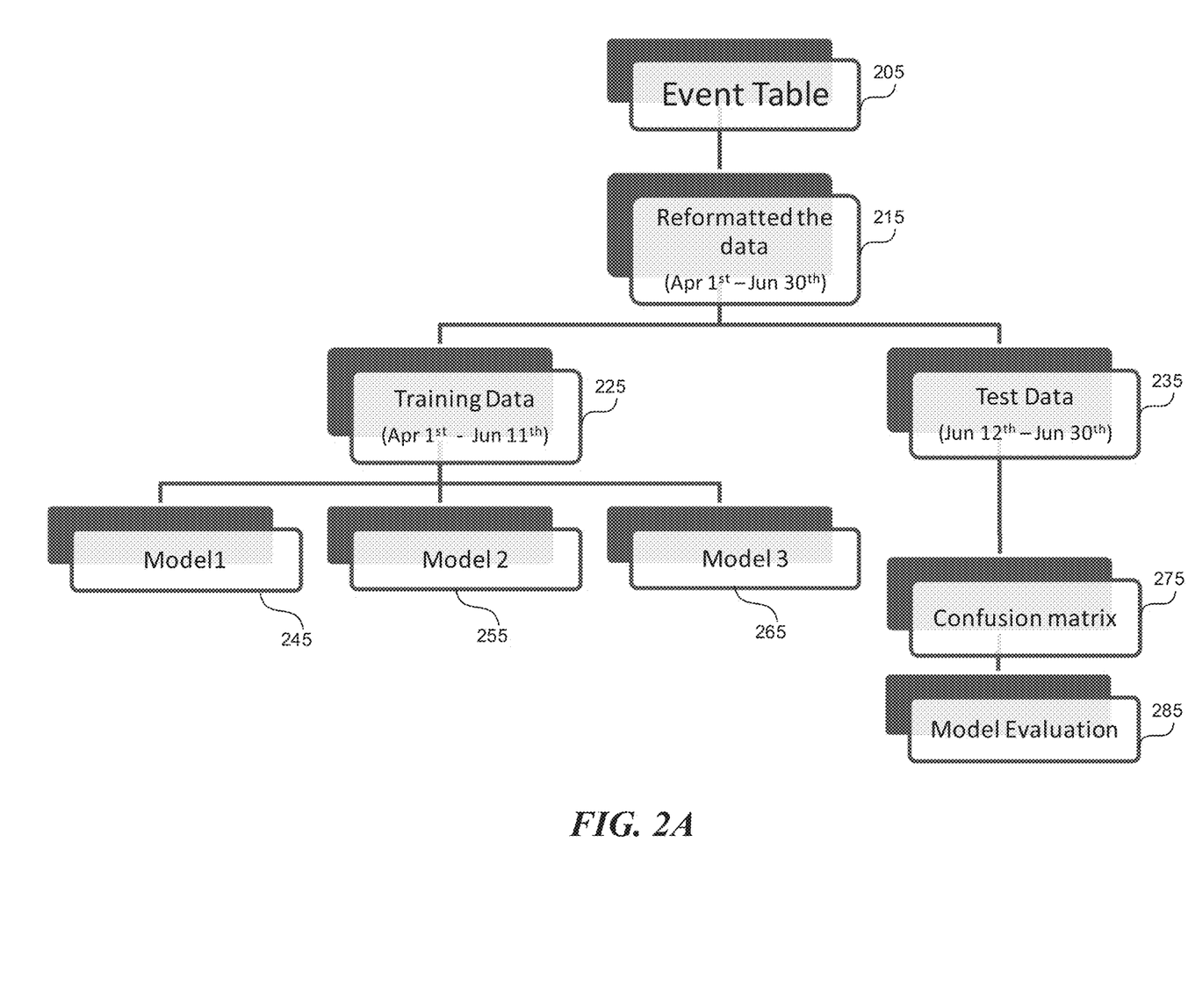
FIG. 2A shows an overview of the system including data processing, training and evaluation of the machine learning models.

FIG. 2A shows an overview of the system including data processing, training and evaluation of the machine learning models. Event table 205 represents data obtained from various databases tracking various aspects of a wireless telecommunication network, as described in FIG. 2B.

In step 215, a hardware or software processor can obtain data from the event table 205 for a certain time period, such as a day, a week, a month or several months. The processor, in step 215 can reformat the data, as described herein, and can separate the data into training data 225 and test data 235. The training data 225 and the test data 235 do not overlap.

Several machine learning models 245, 255, 265 can be trained using the training data 225. The machine learning models 245, 255, 265 can then be tested using the testing data 235. For example, each machine learning model 245, 255, 265 can produce a confusion matrix 275 (only one shown for brevity). In step 285, the processor can use the confusion matrix 275 to evaluate the performance of the machine learning models 245, 255, 265.

If the machine learning model 245, 255, 265 passes the test, the machine learning model can be deployed to make predictions of which users will complain and/or call the care center before the call is placed. To prevent the problem for occurring and/or to reduce the number of calls to the care center, once the machine learning model 245, 255, 265 makes the prediction, the processor can obtain the geolocation, such as latitude and longitude, of the users who are predicted to call the care center. By considering the geolocation of the users likely to make the call to the care center, the processor can determine whether a particular geographic area contains, or is expected to contain, a higher density of complaints than the average density of complaints. Consequently, the processor can suggest a remedial action to perform within the particular geographic area, such as installing a new cell tower, a sector and/or an antenna.

Figure 2B:
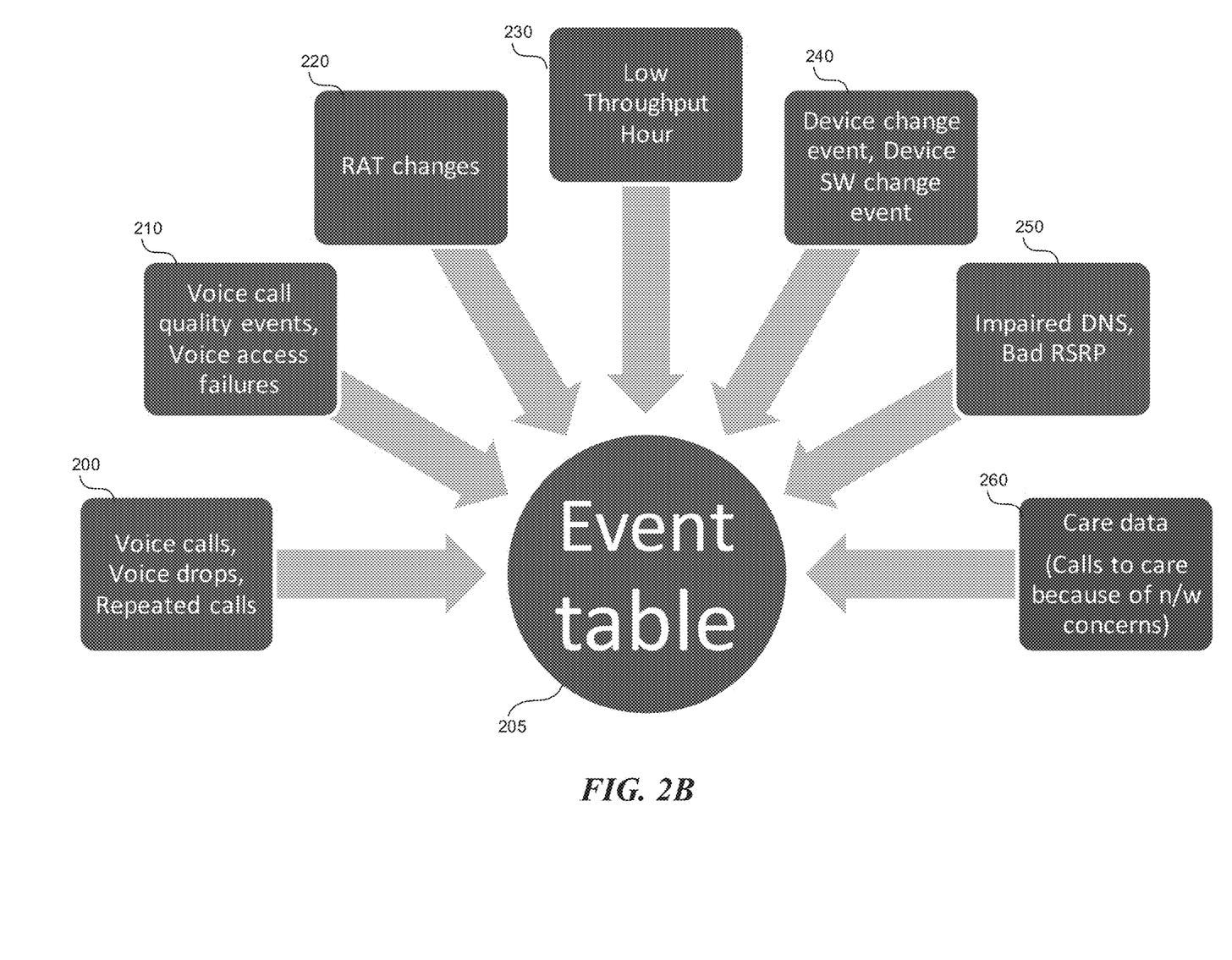
FIG. 2B shows various sources for the event table.

FIG. 2B shows various sources for the event table 205 in FIG. 2A. Multiple databases 200, 210, 220, 230, 240, 250, 260 contain various data describing various aspects of the wireless telecommunication network. In step 215 in FIG. 2A, a processor can format the data contained in the databases 200, 210, 220, 230, 240, 250, 260. The data contained in the databases 200, 210, 220, 230, 240, 250, 260 can come from trouble tickets that record complaints made by the wireless telecommunication network users, or can come from monitoring systems recording performance of the wireless telecommunication network.

Database 200 includes information about voice calls, voice call drops and repeated calls. Voice calls represents the total number of calls. Voice drops represent the total number of dropped calls. Repeated calls represent the number of times a user calls the same number after a dropped call.

For example, in step 215 of FIG. 2A, the processor formats the data from database 200 to determine the ratio between total calls and total dropped calls. For example, if a user makes 100 calls in a day, and 5 are dropped, that number is less indicative of a problem than if a user makes 10 calls a day and 2 are dropped. The calculated ratio is then used as training data 225 in FIG. 2A and test data 235 in FIG. 2A.

Database 210 includes information about RSRQ such as voice call quality events and voice access failures. RSRQ is one of the key measures of signal level and quality for modern wireless telecommunication networks, such as LTE networks. In wireless telecommunication networks, when a mobile device moves from cell to cell and performs cell selection/reselection and handover, the mobile device has to measure the signal strength and quality of the neighbor cells. In the procedure of handover, the LTE specification provides the flexibility of using RSRP, RSRQ, or both. RSRQ is a carrier-to-interference type of measurement, and it indicates the quality of the received reference signal. The Carrier-to-Interference (C/I) ratio is the ratio, expressed in dB, between a desired carrier (C) and an interfering carrier (I) received by the same receiver, which is called the "victim" receiver.

Database 220 includes a number of Radio Access Technology (RAT) changes. RAT is the underlying physical connection method for a radio-based communication network, such as LTE, 5G, 3G, 2G, etc. A RAT change indicates that the underlying network has switched from, for example, LTE to 2G, or 3G to 5G.

Database 230 includes information about how frequently a user device experiences low throughput for audio and/or video. For example, the information can represent how many hours during the day did the user device experience low network performance, such as low data speed for audio and/or video. Database 240 contains information regarding when a user changes the user device, or when the user device has a software update.

Database 250 includes information about the wireless telecommunication network such as RSRP and whether the domain name server (DNS) is impaired.

RSRP along with RSRQ, described above, are key measures of signal level and quality for modern wireless telecommunication networks. In wireless telecommunication networks, when a mobile device moves from cell to cell and performs cell selection/reselection and handover, the mobile device has to measure the signal strength/quality of the neighbor cells. The RSRP is the power of the LTE Reference Signals spread over the full bandwidth and narrowband. A minimum of −20 dB signal-to-interference-plus-noise ratio (SINR) is needed to detect RSRP/RSRQ.

DNS plays a critical role in the performance of user devices within wireless telecommunication networks. Besides name resolution, DNS is commonly relied upon for directing users to nearby content caches for better performance. If the DNS is impaired, the service that the user device receives from the telecommunication networks can reduce in quality, for example, bandwidth, or completely halt.

Finally, the database 260 contains information about calls to a care center and/or user complaints because of network problems that the user is experiencing. The care center can be customer support. The information contained in database 270 can be used to verify the accuracy of machine learning models 245, 255, 265 in FIG. 2A, to generate the confusion matrix 275 in FIG. 2A, and to perform model evaluation in step 285 in FIG. 2A.

The database 260 can be a relational database. To extract data from the database 216 a processor can perform natural language processing (NLP) to get the identifiers of the user devices experiencing problems. The identifiers can be phone numbers of the phones.

Figure 3:
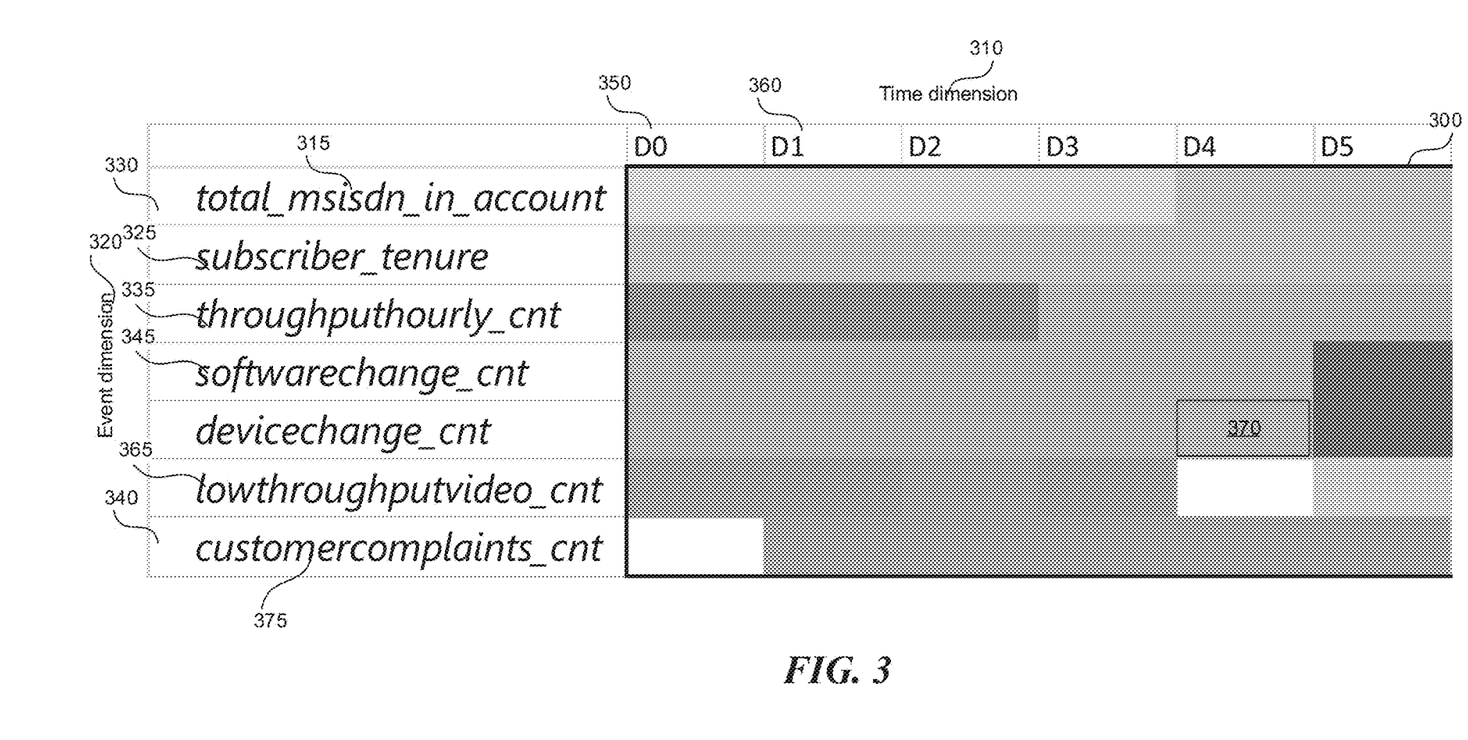
FIG. 3 shows reformatted data obtained from the event table.

FIG. 3 shows reformatted data obtained from the event table 205 in FIGS. 2A-B. In step 215 in FIG. 2A, a processor reformats the data received from the event table 205. The processor can reformat the data into an image 300, where one dimension 310 of the image 300 represents time, and the other dimension 320 represents measured events.

The time dimension 310 can be subdivided into periods, such as hours, days (as shown in FIG. 3), weeks, months, etc. A single column of pixels 350, 360 (only two labeled for brevity) can represent the events occurring within time period 350, 360 respectively, for example, day 0 or day 1, as shown in FIG. 3.

A single row of pixels 330, 340 (only two labeled for brevity) can represent a single measured event. The measured events 315, 325, 335, 345, 355, 365 and 375 represented in dimension 320 can contain events from the event table 205 in FIGS. 2A-B. The value of the measured events 315, 325, 335, 345, 355, 365, 375 can be color-coded. For example, a pixel 370 can represent how many times the user changed the device on day 4. The value shown by the pixel 370 can be the reformatted value of the KPI included in the event table 205.

For example, in step 215 in FIG. 2A, the processor formats the data from the database 230 to determine value of the measured event 365, low throughput video count. The data in the database 230 can measure the speed of the connection between the user device and the telecommunication network for a predetermined time period, such as an hour. If the connection is less than 1.5 Mb per for a duration of a time period, such as an hour, the low throughput video count 365 is incremented by 1. If, for example, the video throughput for a period of six hours is less than 1.5 Mb per second, then the low throughput video count 365 count is incremented by six.

In another example, in step 215, the processor formats the data in the database 250 to determine the value of the RSRP. If the RSRP is below a predetermined threshold which defines a good signal, such as below −90 dBm, the processor determines that RSRP is bad. The processor can check at a predetermined time period, such as every hour, whether the RSRP is bad. Even if the RSRP is bad during the predetermined time period, the processor does not increment the RSRP. Instead, the processor determines whether the RSRP is bad during several consecutive predetermined time periods, such as three consecutive hours, and then the processor increments the RSRP count.

Measured event 315, total_msisdn_in_account, indicates how many phone lines are associated with the account. If there is one phone line, that means that only a single cell phone is using the account. Measured event 325, subscriber tenure, indicates how long the user has been a user of the wireless telecommunication network. Measured event 335, throughputhourly_cnt, indicates the quality of the voice throughput every hour. Measured event 345, softwarechange_cnt, indicates whether the user device has had a software update during the day. Measured event 355, devicechange_cnt, indicates whether the user has changed the device during the day. Measured event 375, customercomplaints_cnt, indicates how many times the user called customer care during the day.

The image 300 is provided as an input to a machine learning model configured to take an image as an input, such as a convolutional neural network (CNN). CNN is computationally efficient and particularly suited to detect occurrences of a low probability event, such as detecting the user making a call to the customer care center. CNN can use gradient descent, rectified linear activation unit (ReLU) and max filtering to make the prediction.

A processor can train the machine learning model using a sliding window of data. Initially, the machine learning model can be trained based on an input data window spanning days 1-7. Then, the processor can slide the window by one day, and use input data from days 2-8 to train the machine learning model. The sliding window enables training of the machine learning model using a small set of data. Further, the sliding window decreases the amount of memory needed for training the machine learning model.

Figure 4:
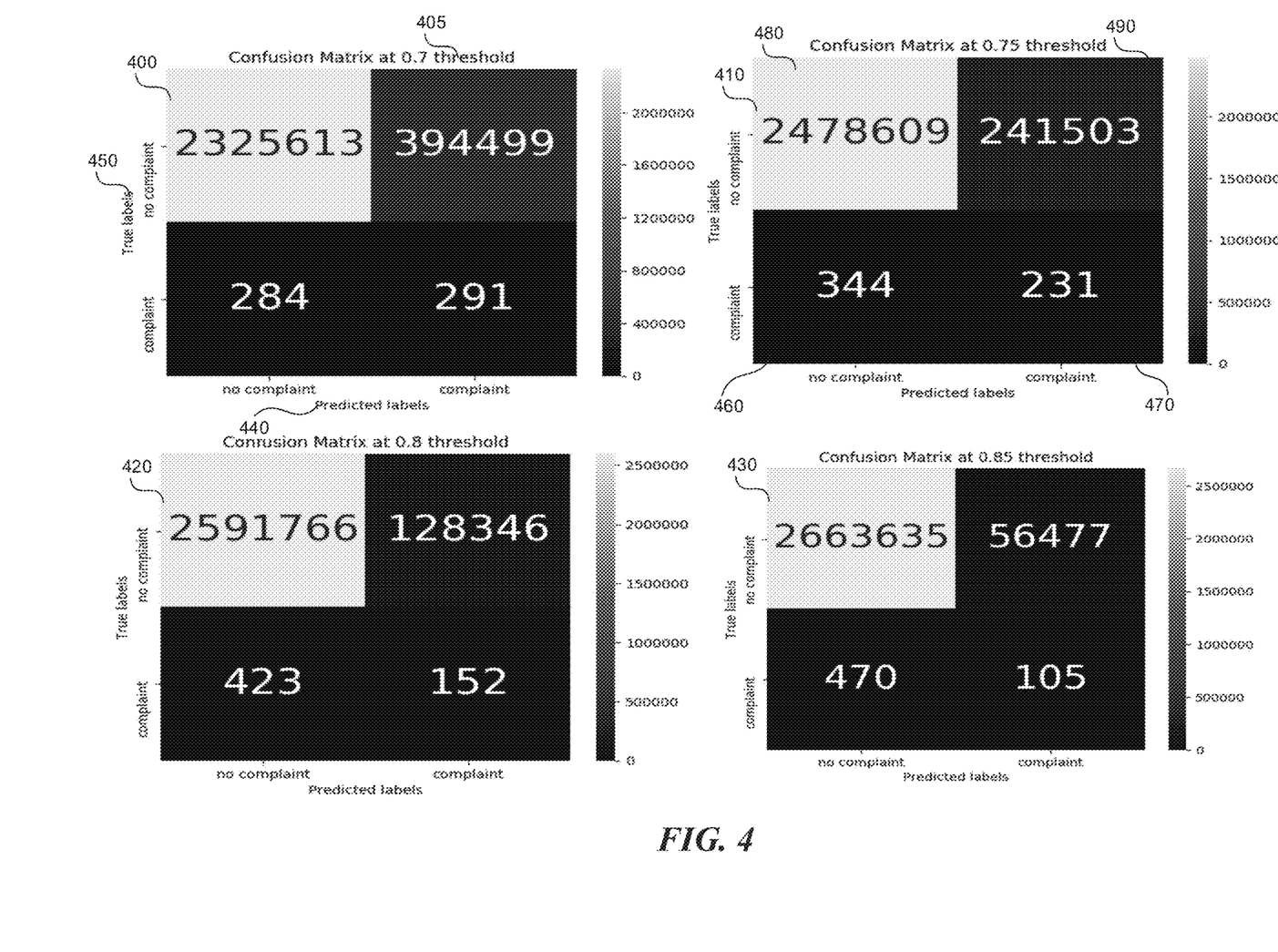
FIG. 4 shows a confusion matrix.

FIG. 4 shows a confusion matrix. Confusion matrix 400, 410, 420, 430 is a criterion used to evaluate performance of a machine learning model 245, 255, 265 in FIG. 2A. The machine learning model 245, 255, 265, upon receiving the input image 300 in FIG. 3, can produce an output number within a predetermined range, such as between 0 and 1, which indicates the probability that the user will call the care center.

The processor applies a threshold function to the output number to produce a binary result such as true or false, 0 or 1, where one value, such as false or 0 indicates that the user will not call the care center while the other value such as true or 1 indicates the user will call the care center. Normally, the threshold is set to 0.5, so when the processor applies the threshold function, the output number below 0.5 becomes 0, while the output number above 0.5 becomes 1. However, the processor can adjust the threshold function to, for example, 0.7 as shown in confusion matrix 400, 0.75 as shown in confusion matrix 410, 0.8 as shown in confusion matrix 420, or 0.85 as shown in confusion matrix 430.

The confusion matrix 400, 410, 420, 430 represents an accuracy of the machine learning model 245, 255, 265. The X-axis 440 (only one labeled for brevity) shows the labels predicted by the machine learning model 245, 255, 265, while the Y-axis 450 (only one labeled for brevity) shows the true labels according to observed data. The observed data contains 2.75 million subscribers. In this data set, out of the 2.75 million subscribers, 575 called customer care and/or made a complaint during a predetermined time period.

The box 460 (only one labeled for brevity) represents the number the number of people that the machine learning model 245, 255, 265 incorrectly predicted will not complain. The box 470 (only one labeled for brevity) represents the number of people that the machine learning model 245, 255, 265 correctly predicted will complain. The box 480 (only one labeled for brevity) represents the number of people that the machine learning model 245, 255, 265 correctly predicted will not complain, while the box 490 (only one labeled for brevity) represents the number of people that the machine learning model 245, 255, 265 incorrectly predicted would complain.

As can be seen from matrices 400, 410, 420, 430, as the threshold 405 (only one labeled for brevity) increases, the number of both incorrectly and correctly predicted complaints decreases, while the number of both incorrectly and correctly predicted lack of complaints increases. Depending on a user preference, the threshold can be adjusted toward the lower end, as shown in matrix 400, or toward the higher end, as shown in matrix 430, depending on whether the user prefers to more accurately predict complaints or lack of complaints.

Figure 5:
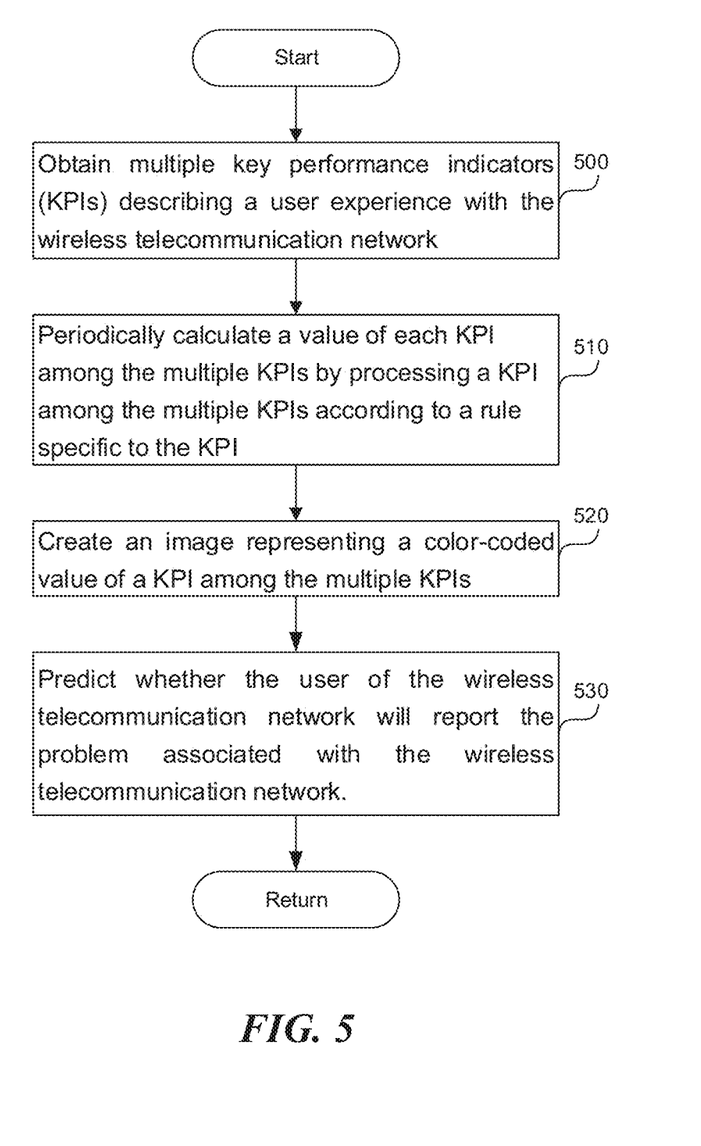
FIG. 5 is a flowchart of a method to predict whether a user of a wireless telecommunication network will report a problem associated with the wireless telecommunication network, by, for example, calling a care center.

FIG. 5 is a flowchart of a method to predict whether a user of a wireless telecommunication network will report a problem associated with the wireless telecommunication network, by, for example, calling a care center. In step 500, a processor can obtain multiple KPIs describing a user experience with the wireless telecommunication network. The multiple KPIs can include at least three of a BAN count, how long the user has been using the wireless telecommunication network, RSRP, an RSRQ, an hourly throughput count, a software change count, a device change count, a customer complaint count, a ratio of dropped calls to placed calls, a number of repeated calls, no coverage locations, etc. The no coverage location can indicate the location of the device when the device experiences no coverage. By collecting no coverage locations for multiple devices, the processor can reconstruct problematic areas, and suggest installation of cell towers, and/or antennas to provide coverage to the no coverage areas.

In step 510, the processor can periodically calculate, at a first predetermined time period, a value of each KPI among the multiple KPIs by processing the KPI according to a rule specific to the KPI. The first predetermined period can be a day, a week, a month, etc.

In one embodiment, to process the KPI, the processor can compare at a second predetermined time period the KPI to a predetermined threshold. The second predetermined time period is smaller or equal to the first predetermined time period. The second predetermined time period can be hourly, daily, weekly, monthly, etc. For example, the first predetermined time period can be a day, and the second predetermined time period can be an hour. The processor can compute a count of how many comparisons are below the predetermined threshold within the first predetermined time period and can set the daily value of the KPI to be equal to the count.

For example, if the KPI is an hourly throughput count, the second predetermined time period is an hour. Consequently, every hour, the processor can compare the hourly throughput to the predetermined threshold, such as 1 Mbps. Every hour that the hourly throughput is less than 1 Mbps, the KPI, namely the hourly throughput count, can be incremented, until the first predetermined time period, such as a day, is over.

In one embodiment, to process the KPI, the processor can compare at a second predetermined time period the KPI to a predetermined threshold. The processor can determine whether a predetermined number of consecutive comparisons produce the same result. If the predetermined number of consecutive comparisons produce the same result, the processor can combine the consecutive comparisons into a single comparison. The processor can compute a count of how many comparisons are below the predetermined threshold within the first predetermined time period, such as a day, and can set the value of the KPI to be equal to the count.

For example, if the KPI is RSRP, the second predetermined time period can be an hour. Consequently, every hour, the processor can determine whether the RSRP during that hour has been below the predetermined threshold, such as below −90 dBm. If the RSRP is below the predetermined threshold for at least three consecutive hours, the processor can increment the value of the KPI. In another example, if there are 4 consecutive RSRP each hour, the processor can increment the value of the KPI by 2.

In step 520, the processor can create an image representing a color-coded value of a KPI among the multiple KPIs. The first axis of the image can represent the KPI, and the second axis of the image can represent the value of the KPI determined during the first predetermined time period, as shown in FIG. 3.

In step 530, the processor can predict whether the user of the wireless telecommunication network will report the problem associated with the wireless telecommunication network by providing the image to a machine learning model, and receiving a prediction from the machine learning model whether the user of the wireless telecommunication network will report the problem. The machine learning model can be a CNN, which is designed to receive an image as an input, and identify low frequency features in the image, such as identifying 575 users who are likely to complain, out of 2.75 million users.

The processor can train the machine learning model by obtaining the multiple KPIs within a first time window, converting the multiple KPIs into an image, and providing the image to the machine learning model. Once the machine learning model is trained, the processor can obtain the multiple KPIs within a second time window, wherein the first time window and the second time window do not overlap. The machine learning model can use the multiple KPIs within the second time window as an input to predict whether the user of the wireless telecommunication network will report the problem.

The processor can determine a problematic geographic area by obtaining multiple reports of multiple problems associated with the wireless telecommunication network, and multiple geolocations of the multiple reports. The processor can identify a geographic area among the multiple geolocations having a number of reports exceeding a predetermined threshold, and flag the geographic area as requiring remedial action.

Computer

Figure 6:
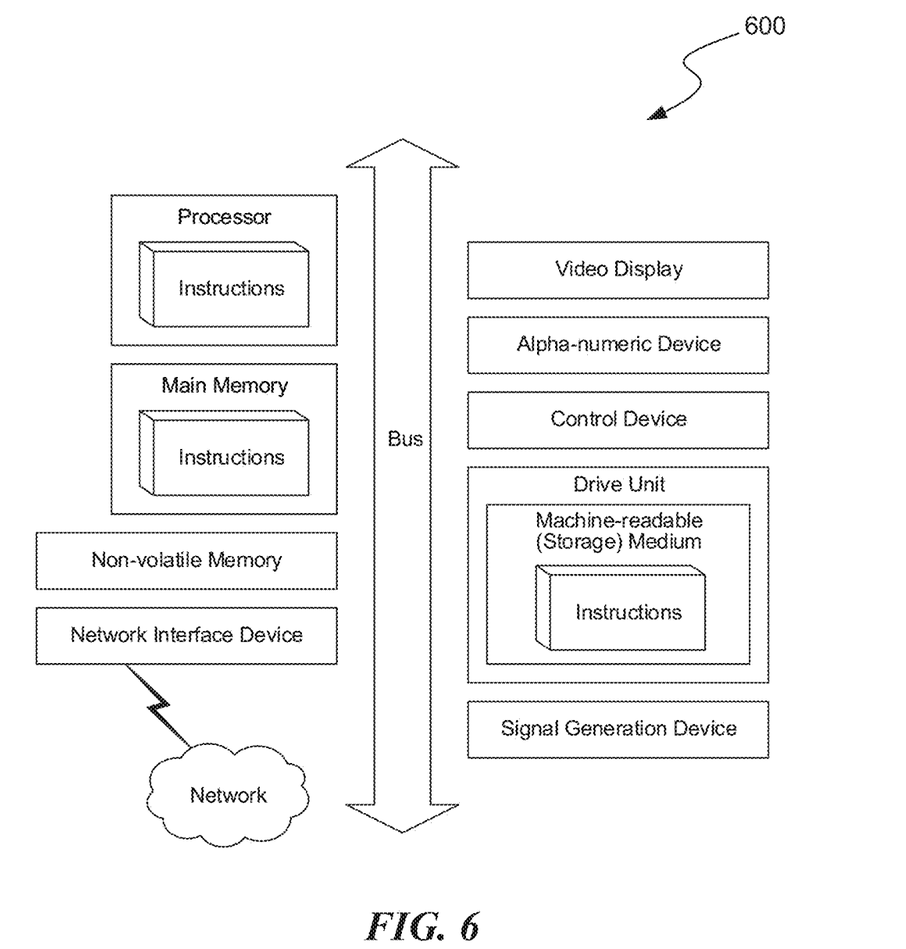
FIG. 6 is a diagrammatic representation of a machine in the example form of a computer system within which a set of instructions, for causing the machine to perform any one or more of the methodologies or modules discussed herein, can be executed.

FIG. 6 is a diagrammatic representation of a machine in the example form of a computer system 600 within which a set of instructions, for causing the machine to perform any one or more of the methodologies or modules discussed herein, can be executed.

In the example of FIG. 6, the computer system 600 includes a processor, memory, non-volatile memory, and an interface device. Various common components (e.g., cache memory) are omitted for illustrative simplicity. The computer system 600 is intended to illustrate a hardware device on which any of the components described in the example of FIGS. 1-5 (and any other components described in this specification) can be implemented. The computer system 600 can be of any applicable known or convenient type. The components of the computer system 600 can be coupled together via a bus or through some other known or convenient device.

The processor of the computer system 600 can perform the various methods described in this application, for example, the method described in FIG. 5. The processor of the computer system 600 can be used to train the machine learning model 245, 255, 265 in FIG. 2A. The main memory, the nonvolatile memory and/or the drive unit of the computer system 600 can store the instructions executed by the processor and/or the event table 205 in FIGS. 2A-2B.

This disclosure contemplates the computer system 600 taking any suitable physical form. As example and not by way of limitation, computer system 600 can be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 can include one or more computer systems 600; be unitary or distributed; span multiple locations; span multiple machines; or reside in a cloud, which can include one or more cloud components in one or more networks. Where appropriate, one or more computer systems 600 can perform without substantial spatial or temporal limitation one or more steps of one or more methods described or illustrated herein. As an example and not by way of limitation, one or more computer systems 600 can perform in real time or in batch mode one or more steps of one or more methods described or illustrated herein. One or more computer systems 600 can perform at different times or at different locations one or more steps of one or more methods described or illustrated herein, where appropriate.

The processor can be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 600. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing an entire large program in memory can not even be possible. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 600. The interface can include an analog modem, ISDN modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 6 reside in the interface.

In operation, the computer system 600 can be controlled by operating system software that includes a file management system, such as a disk operating system. One example of operating system software with associated file management system software is the family of operating systems known as Windows® from Microsoft Corporation of Redmond, Wash., and its associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description can be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems can be used with programs in accordance with the teachings herein, or it can prove convenient to construct more specialized apparatus to perform the methods of some embodiments. The required structure for a variety of these systems will appear from the description below. In addition, the techniques are not described with reference to any particular programming language, and various embodiments can thus be implemented using a variety of programming languages.

In alternative embodiments, the machine operates as a standalone device or can be connected (e.g., networked) to other machines. In a networked deployment, the machine can operate in the capacity of a server or a client machine in a client-server network environment, or as a peer machine in a peer-to-peer (or distributed) network environment.

The machine can be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, can be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, can comprise a transformation, such as a physical transformation. With particular types of memory devices, such a physical transformation can comprise a physical transformation of an article to a different state or thing. For example, but without limitation, for some types of memory devices, a change in state can involve an accumulation and storage of charge or a release of stored charge. Likewise, in other memory devices, a change of state can comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device can comprise a transformation, such as a physical transformation. Rather, the foregoing are intended as illustrative examples.

A storage medium typically can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Remarks

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, and any that may be listed in accompanying filing papers, are incorporated herein by reference in the entirety, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C. § 112(f), other aspects may likewise be embodied as a means-plus-function claim, or in other forms, such as being embodied in a computer-readable medium. (Any claims intended to be treated under 35 U.S.C. § 112(f) will begin with the words "means for", but use of the term "for" in any other context is not intended to invoke treatment under 35 U.S.C. § 112(f).) Accordingly, the applicant reserves the right to pursue additional claims after filing this application to pursue such additional claim forms, in either this application or in a continuing application.

We claim:

1. At least one non-transient, computer-readable medium, carrying instructions that, when executed by at least one data processor, implement a process comprising:
   receiving a value of each of multiple key performance indicators (KPIs) according to a rule for the KPIs,
      wherein each KPI relates to a user experience with a wireless telecommunication network;
   creating a particular image representing a value of a KPI among the multiple KPIs,
      wherein a first axis of the particular image represents the KPI among at least one of the multiple KPIs, and
      wherein a second axis of the particular image represents the value of the KPI among the at least one of the multiple KPIs; and
   predicting whether a user of the wireless telecommunication network will report a problem associated with the wireless telecommunication network by:
      providing the particular image to a machine learning model configured to make a prediction based on an image, and
      receiving a particular prediction from the machine learning model indicating whether the user of the wireless telecommunication network will report the problem.

2. The non-transient, computer-readable medium of claim 1, further comprising:
   obtaining multiple reports of multiple problems associated with the wireless telecommunication network, and multiple geolocations of the multiple reports;
   identifying a geographic area among the multiple geolocations having a number of reports exceeding a predetermined threshold; and
   marking the geographic area as requiring remedial action.

3. The non-transient, computer-readable medium of claim 1, further comprising:
   training the machine learning model by obtaining the multiple KPIs within a first time window;
   obtaining the multiple KPIs within a second time window, wherein the first time window and the second time window do not overlap; and
   using, by the machine learning model, the multiple KPIs within the second time window as an input to the machine learning model to predict whether the user of the wireless telecommunication network will report the problem.

4. The non-transient, computer-readable medium of claim 1, wherein processing the multiple KPIs further comprises:
   calculating, at a first predetermined time period, the value of each KPI among the multiple KPIs;
   comparing at a second predetermined time period the KPI to a predetermined threshold;
   computing a count of how many comparisons are below the predetermined threshold within the first predetermined time period; and
   setting the value of the KPI to be equal to the count.

5. The non-transient, computer-readable medium of claim 1, wherein processing the multiple KPIs further comprises:
calculating, at a first predetermined time period, the value of each KPI among the multiple KPIs;
comparing at a second predetermined time period the KPI to a predetermined threshold;
determining whether a predetermined number of consecutive comparisons produce the same result;
combining the consecutive comparisons into a single comparison;
computing a count of how many comparisons are below the predetermined threshold within the first predetermined time period; and
setting the value of the KPI to be equal to the count.

6. The non-transient, computer-readable medium of claim 1, wherein the multiple KPIs comprise at least two of: a billing account number (BAN) count, how long the user has been using the wireless telecommunication network, Reference Signals Received Power (RSRP), a Reference Signal Received Quality (RSRQ), an hourly throughput count, a software change count, a device change count, a customer complaint count, a ratio of dropped calls to placed calls, or a number of repeated calls.

7. A hardware system, comprising:
one or more hardware processors; and
at least one memory coupled to the one or more processors, wherein the memory includes instructions executable by the one or more processors to:
receive a value of each of multiple key performance indicators (KPIs) according to a rule,
wherein each KPI relates to a user experience with a wireless telecommunication network;
create a particular image representing a value of a KPI from among the multiple KPIs,
wherein a first axis of the particular image represents the KPI among at least one of the multiple KPIs, and
wherein a second axis of the particular image represents the value of the KPI among the at least one of the multiple KPIs; and
predict whether a user of the wireless telecommunication network will report an issue associated with the wireless telecommunication network by:
providing the particular image to a machine learning model configured to make a prediction based on an image, and
receiving a particular prediction from the machine learning model indicating whether the user of the wireless telecommunication network will report the issue.

8. The system of claim 7, further comprising the instructions to:
obtain multiple reports of multiple problems associated with the wireless telecommunication network, and multiple geolocations of the multiple reports;
identify a geographic area among the multiple geolocations having a number of reports exceeding a predetermined threshold; and
identify the geographic area as requiring remedial action.

9. The system of claim 7, wherein the machine learning model comprising a convolutional neural network.

10. The system of claim 7, further comprising the instructions to:
train the machine learning model by obtaining the multiple KPIs within a first time window;
obtain the multiple KPIs within a second time window, wherein the first time window and the second time window do not overlap; and
use, by the machine learning model, the multiple KPIs within the second time window as an input to the machine learning model to predict whether the user of the wireless telecommunication network will report the issue.

11. The system of claim 7, wherein the instructions to process the multiple KPIs further comprise the instructions to:
calculating, at a first predetermined time period, the value of each KPI among the multiple KPIs;
compare at a second predetermined time period the KPI to a predetermined threshold;
compute a count of how many comparisons are below the predetermined threshold within the first predetermined time period; and
set the value of the KPI to be equal to the count.

12. The system of claim 7, wherein the instructions to process the multiple KPIs further comprise the instructions to:
calculating, at a first predetermined time period, the value of each KPI among the multiple KPIs;
compare at a second predetermined time period the KPI to a predetermined threshold;
determine whether a predetermined number of consecutive comparisons produce the same result;
combine the consecutive comparisons into a single comparison;
compute a count of how many comparisons are below the predetermined threshold within the first predetermined time period; and
set the value of the KPI to be equal to the count.

13. The system of claim 7, wherein the multiple KPIs comprise at least two of: a billing account number (BAN) count, how long the user has been using the wireless telecommunication network, Reference Signals Received Power (RSRP), a Reference Signal Received Quality (RSRQ), an hourly throughput count, a software change count, a device change count, a customer complaint count, a ratio of dropped calls to placed calls, or a number of repeated calls.

14. At least one computer-readable medium, excluding transitory signals, and carrying instructions for analyzing a wireless telecommunication network, the instructions comprising:
periodically calculating a value of each of multiple key performance indicators (KPIs) according to a rule,
wherein the KPIs relate to a user experience with the wireless telecommunication network;
providing a particular image representing a value associated with at least one KPI, wherein a first axis of the particular image represents the KPI, and wherein a second axis of the particular image represents the periodic value of the KPI;
determining whether the user of the wireless telecommunication network will report an issue associated with the wireless telecommunication network by:
providing the particular image to a machine learning model configured to make a prediction based on an image; and, obtaining a particular prediction from the machine learning model indicating whether the user of the wireless telecommunication network will report the issue.

15. The at least one computer-readable medium of claim 14, further comprising:
receiving user reports of multiple problems associated with the wireless telecommunication network and multiple geolocations of the multiple reports;
identifying an area among the multiple geolocations having a number of reports exceeding a predetermined threshold; and,
flagging the area as requiring further action, to thereby reduce a number of dissatisfied users and a number of user calls to report the issue.

16. The at least one computer-readable medium of claim 14, further comprising:
employing an autonomous agent or a chatbot to identify if the issue is at the user's home or work, and
sending to the user a message related to service credits or bonus data.

17. The at least one computer-readable medium of claim 14, further comprising:
determining that the issue is in a geographic area and that the issue has existed for approximately a month;
determining that a sector at a cell should be added, the cell should be split, or a small cell should be deployed, to thereby perform a network upgrade in the area; and,
sending messages to inform affected users in the area of the network upgrade.

18. The at least one computer-readable medium of claim 14, further comprising:
determining that the issue relates to a specific user device; and,
sending a message offering an upgrade device to the user, wherein the upgrade device is a determined best performing device relative to the issue.

19. The at least one computer-readable medium of claim 14, wherein the machine learning model is a convolutional neural network.

* * * * *